United States Patent
Lee

(10) Patent No.: US 7,107,082 B2
(45) Date of Patent: Sep. 12, 2006

(54) METHOD OF EXCHANGING DATA BETWEEN MOBILE PHONES

(75) Inventor: Jae Young Lee, Seoul (KR)

(73) Assignee: SK Teletech Co., Ltd., Seoul (KR)

( * ) Notice: Subject to any disclaimer, the term of this patent is extended or adjusted under 35 U.S.C. 154(b) by 509 days.

(21) Appl. No.: 10/068,479

(22) Filed: Feb. 7, 2002

(65) Prior Publication Data
US 2002/0165016 A1    Nov. 7, 2002

(30) Foreign Application Priority Data
Feb. 7, 2001    (KR)    ................................. 2001-5795

(51) Int. Cl.
*H04B 1/38*    (2006.01)
(52) U.S. Cl. .................... 455/575.1; 455/445; 455/560
(58) Field of Classification Search ................ 455/445, 455/446, 456.1, 524, 560, 561
See application file for complete search history.

(56) References Cited

U.S. PATENT DOCUMENTS

| | | | |
|---|---|---|---|
| 6,192,055 B1 | 2/2001 | Rasanen | |
| 6,370,399 B1* | 4/2002 | Phillips | ...................... 455/564 |
| 2001/0012789 A1 | 8/2001 | Sasaki | |
| 2002/0016173 A1* | 2/2002 | Hunzinger | .................. 455/456 |
| 2002/0037712 A1* | 3/2002 | Shin | ........................... 455/445 |

FOREIGN PATENT DOCUMENTS

| | | |
|---|---|---|
| JP | 9-205680 A | 8/1997 |
| JP | 9-284379 A | 10/1997 |
| JP | 11-136763 A | 5/1999 |
| JP | 11-513215 A | 11/1999 |
| JP | 2000-349829 A | 12/2000 |

OTHER PUBLICATIONS

Japanese Patent Office; "Notification of Reasons for Refusal"; Transmission date Mar. 29, 2005 w/ English translation (4 pages).

* cited by examiner

*Primary Examiner*—George Eng
*Assistant Examiner*—Sam Bhattacharya
(74) *Attorney, Agent, or Firm*—Morgan & Finnegan, L.L.P.

(57) ABSTRACT

The present invention is related to a method of exchanging data between mobile phones through an inter-working function or proxy inter-working function service. The method includes a first step in which as a transmitting user manipulates a keypad of a transmitting mobile phone, the transmitting mobile phone enters transmission mode. At a second step, as a receiving user manipulates a keypad of a receiving mobile phone, the receiving mobile phone enters reception mode. Thereafter, the transmitting and receiving mobile phones are operated in data exchange mode for transmitting data from the transmitting mobile phone to the receiving mobile phone. Finally, data transmission from the transmitting mobile phone to the receiving mobile phone is completed.

3 Claims, 7 Drawing Sheets

[Fig. 1] - Prior Art -
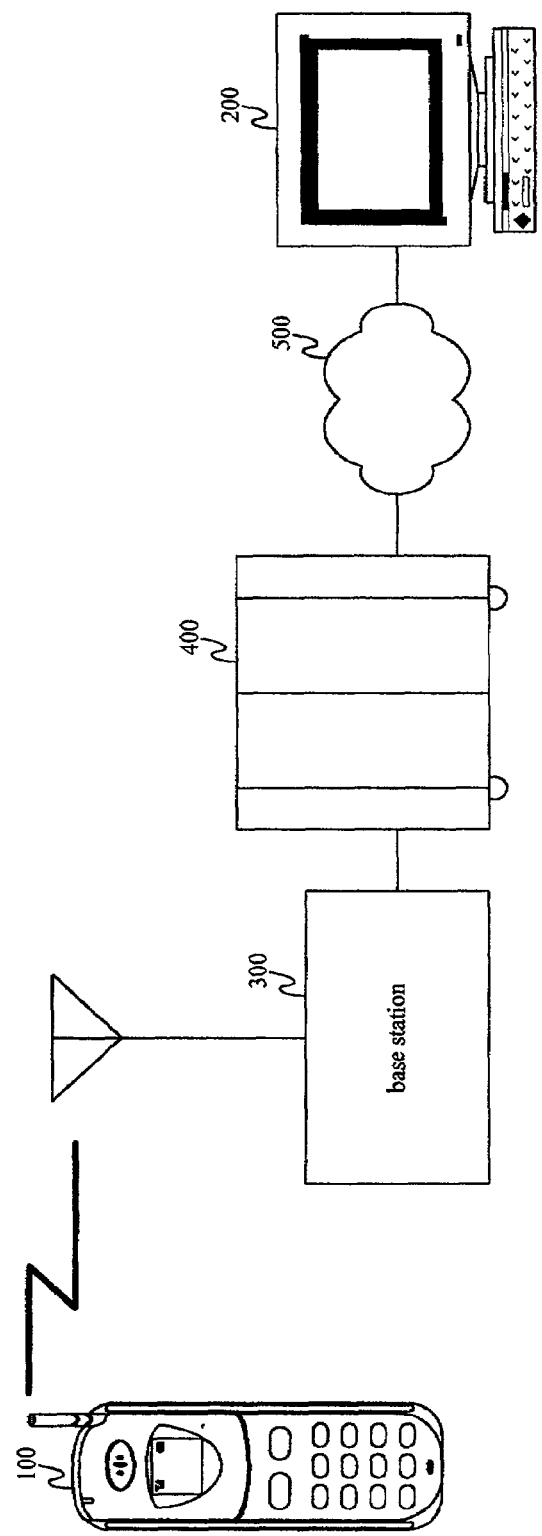

[Fig. 2]
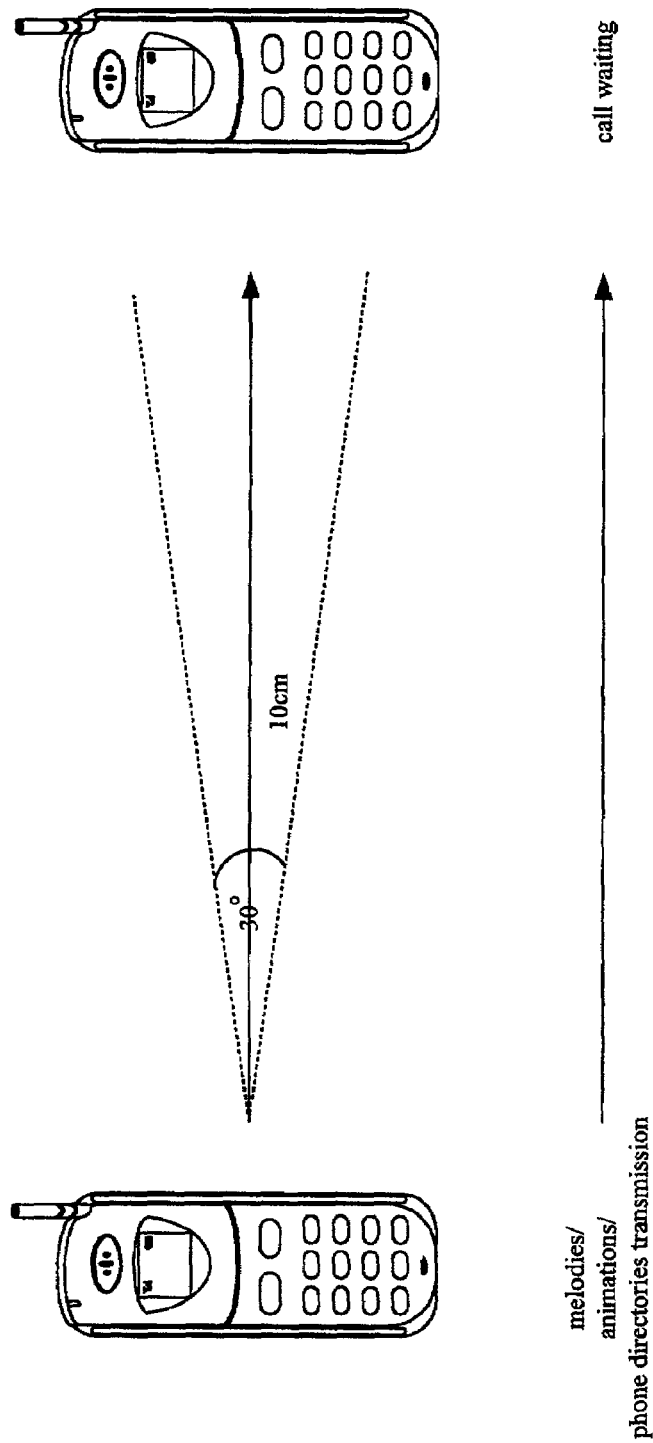

[Fig. 3]
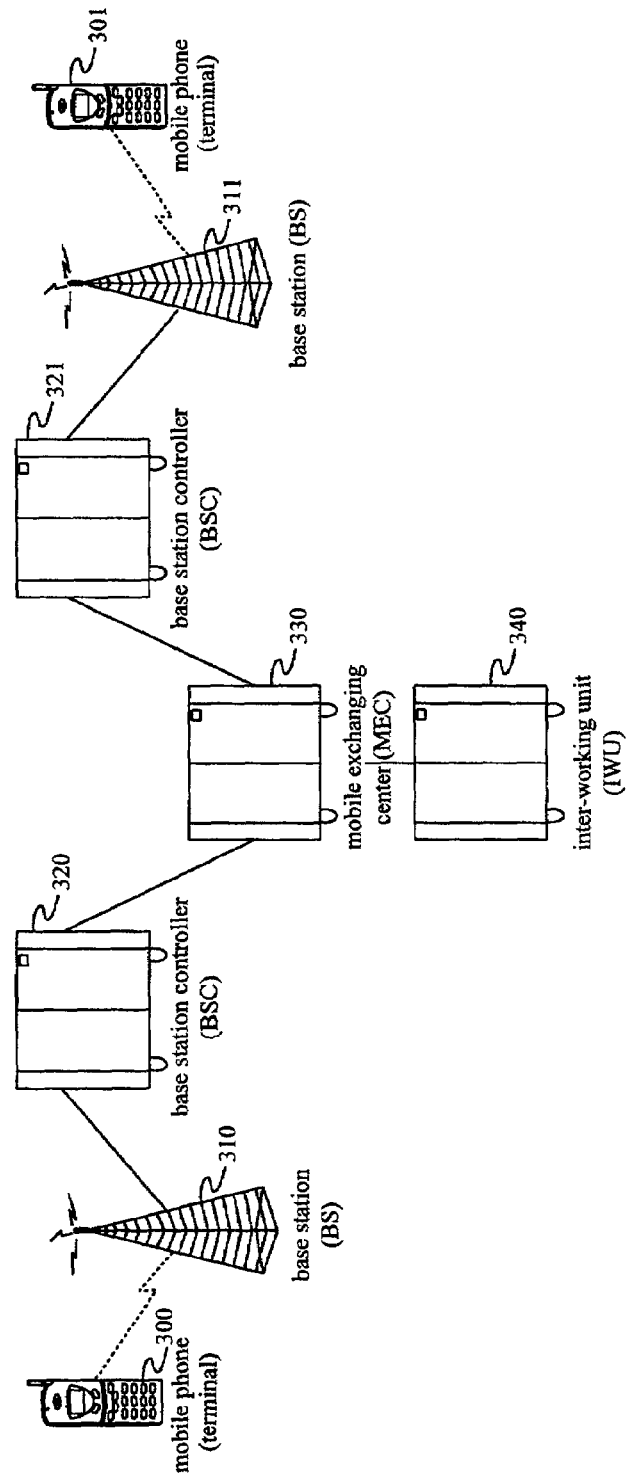

[Fig. 4]
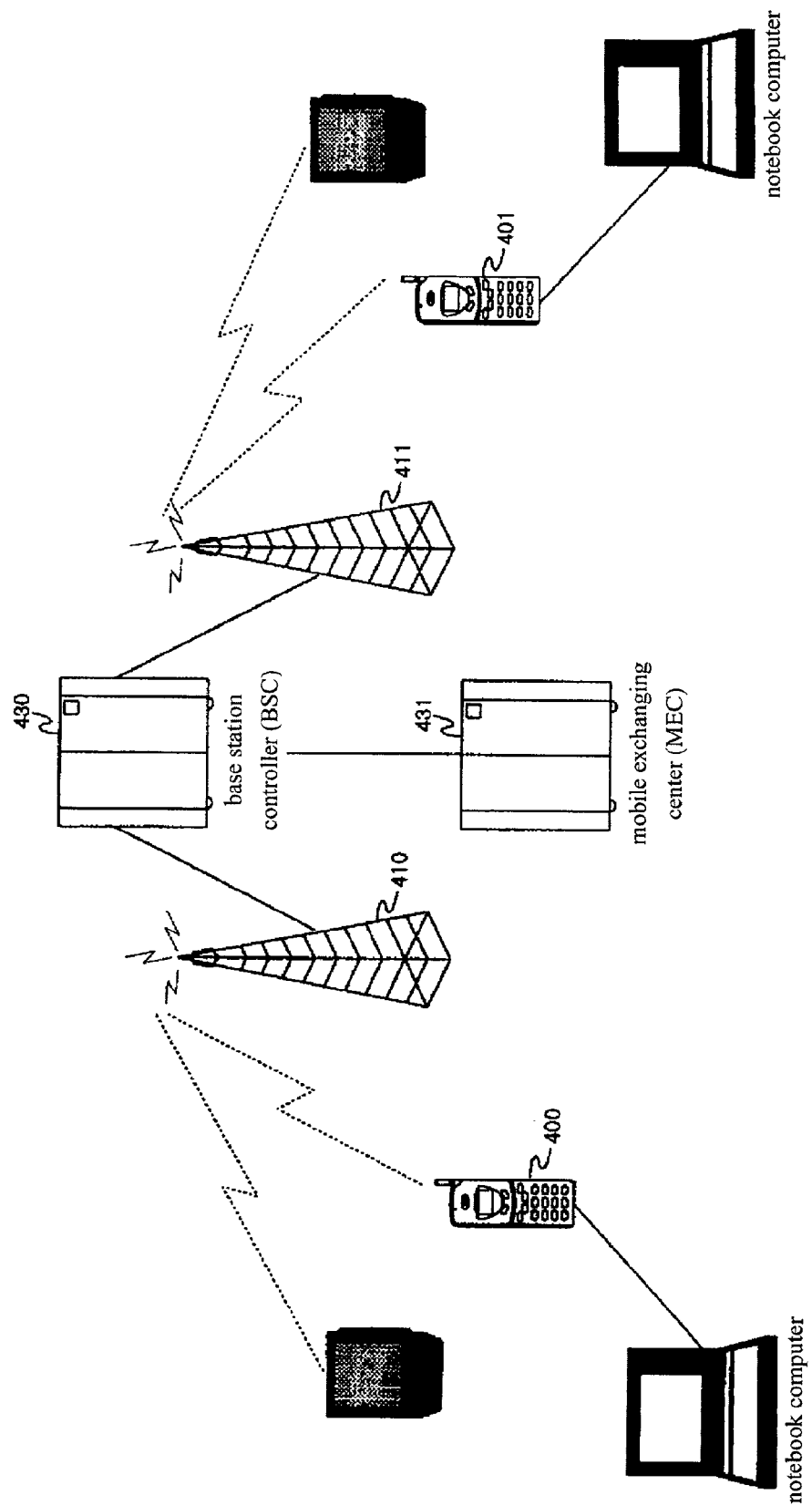

[Fig. 5]
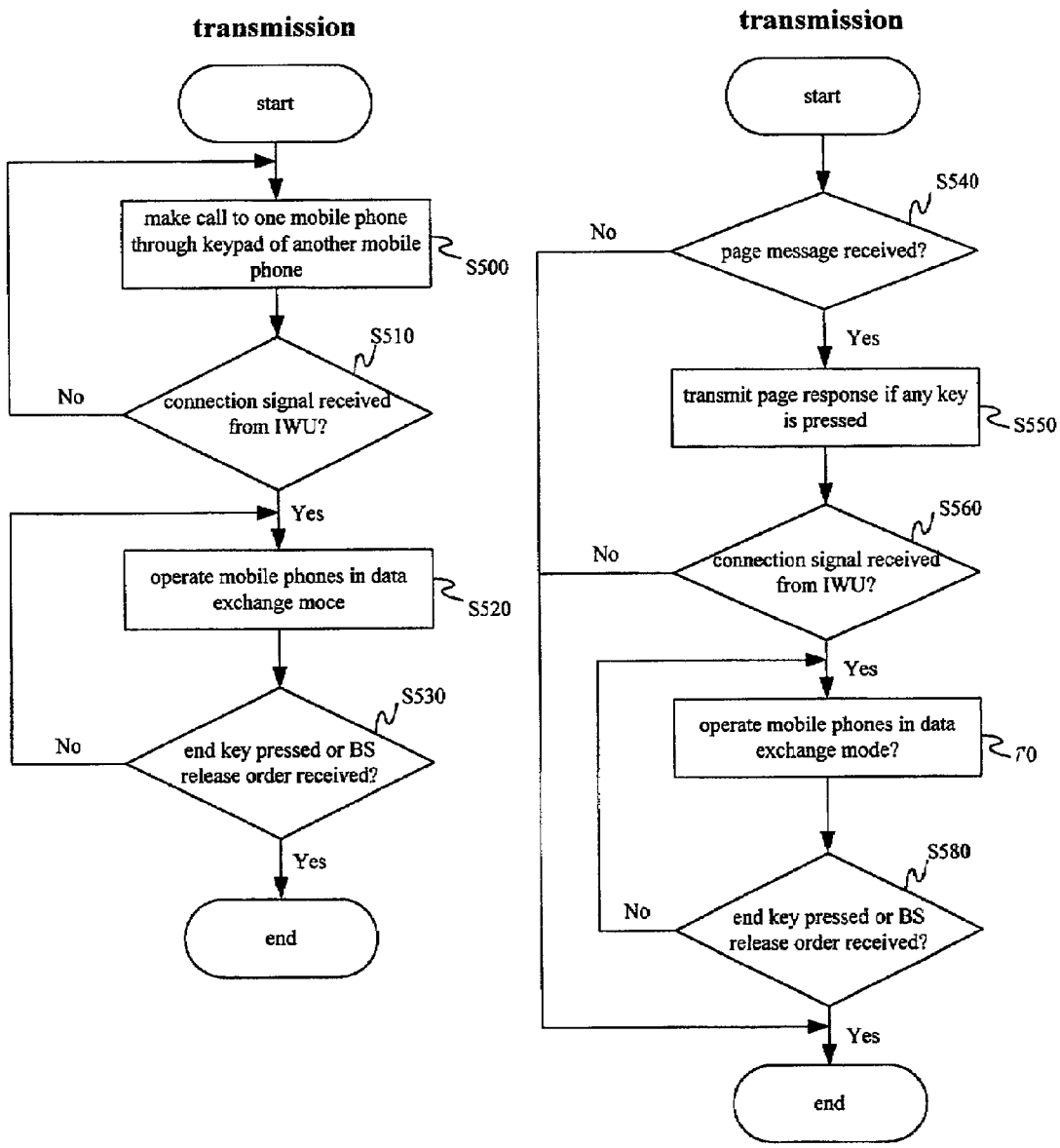

[Fig. 6]
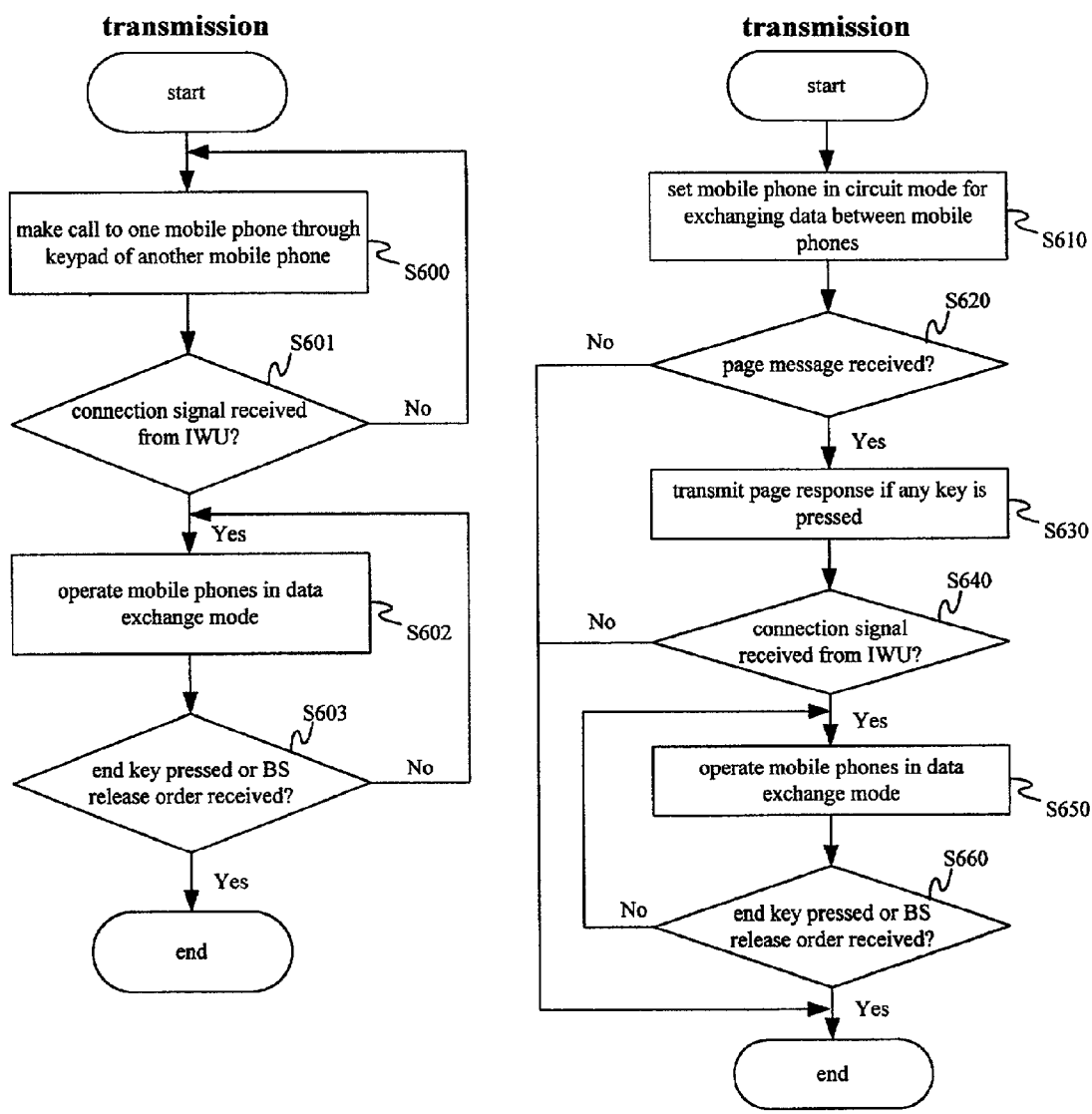

[Fig. 7]
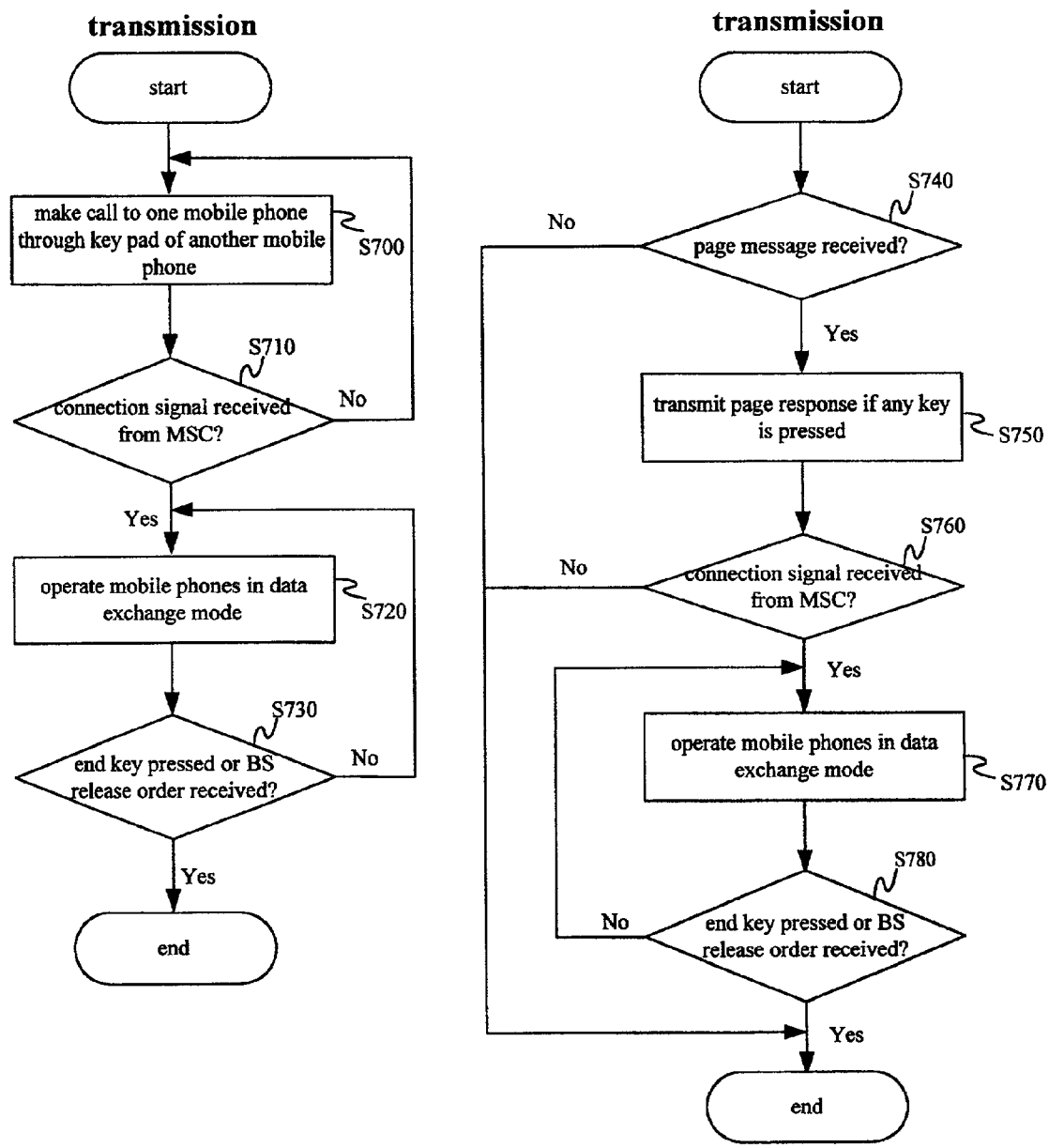

METHOD OF EXCHANGING DATA BETWEEN MOBILE PHONES

BACKGROUND OF THE INVENTION

1. Field of the Invention

The present invention relates generally to a method of exchanging data between mobile phones, and more particularly to a method in which one mobile phone is connected with another mobile phone and exchanges data, such as melodies, animations, phone directories or multimedia files, with the other through an inter-working function or proxy inter-working function service.

2. Description of the Prior Art

With the development of mobile phones, the users of mobile phones store data, such as personal information, phone directories, schedules, in their mobile phones. Accordingly, users usually carry mobile phones as one of their necessities such as a diary or a pocket book. Additionally, the users of mobile phones often desire to share their information stored in their mobile phones with other persons by exchanging it with them.

As a result, the users of mobile phones demand technology for transmitting data stored in one mobile phone to another mobile phone and receiving data transmitted from the other phone.

Such technology is implemented for example in a system as shown in FIG. 1, which is comprised of a base station 300, a mobile switching center 400, and a telephone network 500. In this drawing, reference numerals 100 and 200 designate a mobile phone and a personal computer, respectively. The detailed description of this system is disclosed in Korean Pat. Appln. No. 2000-0052451. In the prior art system, although data exchange is easily performed, there are still inconveniences in exchanging data in that a certain computer program must be used and a computer must intervene in the exchange.

As another example of conventional data exchange technology, there is disclosed data exchange using infrared communication, as shown for example in FIG. 2.

The infrared ports of mobile phones are employed to allow data, such as melodies, animations, and phone directories, to be exchanged between mobile phones. In this case, a receiving mobile phone must be situated within the range of an angle of 30° and a distance of 10 cm from the infrared port of a transmitting mobile phone. Accordingly, when one mobile phone is not situated in physical proximity to another mobile phone, they cannot exchange data with each other. In brief, conventional data exchange is not reliable and has a functional distance limitation.

SUMMARY OF THE INVENTION

Accordingly, the present invention has been made keeping in mind the above disadvantages of the prior art. One object of the present invention is to provide a method of exchanging data between mobile phones, which is capable of exchanging data between mobile phones which are situated away from each other, through an Inter-Working Function (IWF) or Proxy Inter-Working Function (PIWF) service.

In order to accomplish the above object, the present invention provides in one embodiment a method of exchanging data between mobile phones through an inter-working function service in an IS-95A/B network, comprising: a first step in which as a transmitting user manipulates a keypad of a transmitting mobile phone, the transmitting mobile phone enters transmission mode; a second step in which as a receiving user manipulates a keypad of a receiving mobile phone, the receiving mobile phone enters reception mode; a third step in which the transmitting and receiving mobile phones are operated in data exchange mode for transmitting data from the transmitting mobile phone to the receiving mobile phone; and a fourth step in which data transmission from the transmitting mobile phone to the receiving mobile phone is completed.

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram showing a conventional system for exchanging data between mobile phones;

FIG. 2 is a view showing conventional data exchange between mobile phones using infrared communication;

FIG. 3 is a diagram showing a system for exchanging data between mobile phones through an IWF service in accordance with an illustrative embodiment of the present invention;

FIG. 4 is a diagram showing a system for exchanging data between mobile phones through a PIWF service in accordance with an illustrative embodiment of the present invention;

FIG. 5 is a flowchart showing data exchange between two mobile phones through the IWF service of FIG. 3 in an IS-95C network;

FIG. 6 is a flowchart showing data exchange between mobile phones through the IWF service of FIG. 3 in the IS-95A/B network; and FIG. 7 is a flowchart showing data exchange between mobile phones as shown in FIG. 4 through the PIWF service.

DESCRIPTION OF THE PREFERRED EMBODIMENTS

Methods of exchanging data between two mobile phones in accordance with the present invention are described in detail hereinafter.

FIG. 3 is a diagram showing a system for exchanging data between mobile phones through the IWF service in accordance with one illustrative embodiment of the present invention.

It is possible for a user to exchange data with another mobile phone through his mobile phone. In order to process data transmitted from one mobile phone and transmit it to another mobile phone, the system in this embodiment is comprised of Base Stations (BSs) 310 and 311, Base Station Controllers (BSCs) 320 and 321, a Mobile Switching Center (MSC) 330 and an Inter-Working Unit (IWU) 340.

In this IWF data exchange system, the BSCs 320 and 321 are situated between the BSs 310 and 311 and the MSC 330, and perform signal message transmission, call processing, transcoding and BS-BSC interface functions.

The MSC 330 determines whether data are circuit switched data (e.g., voice data transmitted through the mobile phone network) or packet switched data (e.g., data transmitted through the Internet). If the data is circuit data, the MSC 311 connects with the IWU 340 for performing modem pool and protocol conversion functions, converts the data into asynchronous or packet data and performs data communication.

Accordingly, the mobile phone 300 can exchange radio data with the mobile phone 301 through the IWU 340.

When the IWF data service is utilized through the IWU, a mobile phone transmits a call through a service option 4 or 12, and receives a data call through the service option 4 or 12. However, in an IS-95A/B network, even though a call is transmitted through the service option 4 or 12, the call is received through a voice call option, that is, a service option 1. Accordingly, in order to recognize the IWF service, a receiving mobile phone is set in reception mode through a MMI and stands by.

FIG. 4 is a view showing a system for exchanging data between mobile phones according to an alternative embodiment of the present invention where the exchanging occurs through the PIWF service.

In order to allow one mobile phone 400 to exchange data with another mobile phone 401, the PIWF data exchange system is comprised in this embodiment of a BSC 430, a MSC 431, and BSs 410 and 411. In this PIWF data exchange system, the functions of the BSs 310 and 311 and the BSCs 320 and 321 are the same as those of the IWF data exchange system. When the mobile phone 400 utilizes the PIWF service, it does not employ a vocoder (i.e., voice encoder/decoder) where a lossy compression usually occurs to reduce bandwidth as is often used in conventional systems, but rather employs a Radio Link Protocol (RLP) to transmit data.

Accordingly, the PIWF-embedded mobile phone 400 is capable of exchanging data with the other mobile phone 401 through the PIWF service.

In detail, when data is exchanged through the PIWF, a mobile phone transmits a call through a service option 0×8003 and receives the call through the same service option. In this case, the receiving mobile phone 401 does not require an additional reception waiting setting through a MMI.

Referring to FIGS. 3 and 4, when PIWF and IWF are employed through IS-95C, IS-95A/B or combination networks, data exchange methods between two mobile phones can be classified into three types, as follows:

1. IS-95C Network
   A. Method of connecting one mobile phone with another through PIWF
      a. The phone number of a receiving mobile phone is inputted through a transmitting mobile phone.
      b. The transmitting mobile phone is connected with the receiving mobile phone.
      c. Data, such as melodies, animations, phone directories, multimedia data (e.g., JPEG, MPEG4, MP3 data) or the like, are transmitted from the transmitting mobile phone to the receiving mobile phone.
   B. Method of connecting one mobile phone with another through IWF
      a. The phone number of a receiving mobile phone is inputted through a transmitting mobile phone.
      b. The transmitting and receiving mobile phones form a relay connection through the IWF data service. In this case, the relay connection means that the two mobile phones are connected with each other in such a way that the mobile phones form an IWF and Transmission Control Protocol (TCP) connection and an IWU performs a relay function.
      c. Data, such as melodies, animations, phone directories, multimedia data (e.g., JPEG, MPEG4, MP3 data) or the like, are transmitted from the transmitting mobile phone to the receiving mobile phone.

2. IS-95A/B Network
   A. Method of connecting one mobile phone with another through PIWF
      a. The phone number of a receiving mobile phone is inputted through a transmitting mobile phone.
      b. The transmitting mobile phone is connected with the receiving mobile phone.
      c. Data, such as melodies, animations, phone directories, multimedia data (e.g., JPEG, MPEG4 or MP3 data) or the like, are transmitted from the transmitting mobile phone to the receiving mobile phone.
   B. Method of connecting one mobile phone with another through IWF
      a. The phone number of a receiving mobile phone is inputted through a transmitting mobile phone.
      b. The transmitting and receiving mobile phones form a relay connection through the IWF data service.
      c. Data, such as melodies, animations, phone directories, multimedia data (e.g., JPEG, MPEG-4 or MP3 data) or the like, are transmitted from the transmitting mobile phone to the receiving mobile phone.

3. Combination of IS-95C Network and IS-95A/B Network
   A. Method of connecting one mobile phone with another through PIWF
      a. The phone number of a receiving mobile phone is inputted through a transmitting mobile phone.
      b. The transmitting mobile phone is connected with the receiving mobile phone.
      c. Data, such as melodies, animations, phone directories, multimedia data (e.g., JPEG, MPEG4, MP3 data) or the like, are transmitted from the transmitting mobile phone to the receiving mobile phone.
   B. Method of connecting one mobile phone with another through IWF
      a. The phone number of a receiving mobile phone is inputted through a transmitting mobile phone.
      b. The transmitting and receiving mobile phones form a relay connection through the IWF data service.
      c. Data, such as melodies, animations, phone directories, multimedia data (e.g., JPEG, MPEG4, MP3 data) or the like, are transmitted from the transmitting mobile phone to the receiving mobile phone.

Service Options (SOs) for the above-described methods are summarized in the following table.

TABLE

| SOs for each method | SO for call transmission | SO for call reception | Remark |
|---|---|---|---|
| IS-95A/B, IWF | 4 or 12 | 1 | Receiving mobile phone is set in reception waiting mode |
| IS-95A/B, PIWF | 0 × 8003 | 0 × 8003 | |
| IS-95C, IWF | 4 or 12 | 4 or 12 | |
| IS-95C, PIWF | 0 × 8003 | 0 × 8003 | |
| IS-95C for transmission and IS-95A/B for reception, IWF | 4 or 12 | 1 | Receiving mobile phone is set in reception waiting mode |
| Different networks for transmission and reception, PIWF | 0 × 8003 | 0 × 8003 | |

FIG. 5 is a flowchart showing data exchange between two mobile phones through the IWF service in the IS-95C network as shown in FIG. 3.

First, a user desiring to transmit data makes a phone call by manipulating the keypad of a mobile phone 300 (that is, a terminal). Then, the mobile phone 300 transmits an origination message for requesting a data call from the BS 310 (S500) through service option 4 or 12. As depicted in FIG. 5, the IWU 340 processes the data call, and transmits to the transmitting mobile phone 300 a signal for informing the transmitting mobile phone 300 of connection with the receiving mobile phone 301 (S510).

When the transmitting and receiving mobile phones 300 and 301 are connected with each other, the mobile phones 300 and 301 are operated in data exchange mode. Accordingly, the transmitting mobile phone 300 considers all data except control data transmitted from the IWU 340 as data transmitted from the receiving mobile phone 301 (S520).

When data exchange is completed, the transmitting user terminates the transmission of data by pressing any key. Alternatively, when a receiving user hangs up, the BS 311 transmits to the transmitting mobile phone 300 a BS release order for informing the transmitting mobile phone 300 of the release of connection. As a result, in either case, one mobile phone terminates the data exchange and the connection with the other mobile phone (S530).

The process of transmitting data in the method discussed with respect to FIG. 5 is now described with reference to the process of receiving data described above. The receiving mobile phone 301 receives a page message having a service option 4 or 12 from the BS 311 (S540). When a user presses any key or opens the folder of the mobile phone, the mobile phone 301 transmits a page response to the page message to the BS 311(S560).

When the transmitting and receiving mobile phones 300 and 301 are connected with each other, the mobile phones 300 and 301 are operated in data exchange mode. Accordingly, the receiving mobile phone 300 considers all data except control data transmitted from the IWU 340 as data transmitted from the receiving mobile phone 301 (S570).

When data exchange is completed, the transmitting user terminates the transmission of data by pressing any key. Alternatively, when a receiving user hangs up, the BS 311 transmits to the transmitting mobile phone 300 a BS release order for informing the transmitting mobile phone 300 of the release of connection. As a result, in either case, one mobile phone terminates the data exchange and the connection with the other mobile phone (S580).

FIG. 6 is a flowchart showing data exchange between two mobile phones through the IWF service in the IS-95A/B network as shown in FIG. 3.

The IS-95A/B network is standardized for the purpose of voice communication, which is different from the IS-95C network which is standardized for the purpose of high-speed data communication. The IS-95A/B network has a low transmission speed. Steps S600 to S603 of the process of transmitting data in the IS-95A/B network are essentially the same as those S500 to S530 of the process of transmitting data in the IS-95C shown in FIG. 5.

In the process of receiving data, the user sets the receiving mobile phone to be operated in a circuit switched mode (e.g., data transmission through a Public Switched Telephone Network using modems) for exchanging data between mobile phones, which is different from the process of transmitting data (S610). The receiving mobile phone set as described above receives a page message having a service option 1 from the BS (S620). When the user presses any key or opens the folder of the mobile phone, the mobile phone 301 transmits a page response to the page message to the BS through a service option 4 or 12 (S630).

The BS transmits the page response to the IWU 340, and the IWU 340 processes the data call and transmits to the transmitting mobile phone 300 a signal for informing the transmitting mobile phone 300 of connection with the receiving mobile phone 301 (S640). If connection is not established, the connection of the transmitting and receiving mobile phones 301 is not indicated or generated and the process is terminated.

When the transmitting and receiving mobile phones 300 and 301 are connected with each other, the mobile phones 300 and 301 are operated in data exchange mode. Accordingly, the transmitting mobile phone 300 considers all data except control data transmitted from the IWU 340 as data transmitted from the receiving mobile phone 301 (S650).

When data exchange is completed, the transmitting user terminates the transmission of data by pressing any key. Alternatively, when a receiving user hangs up, the BS 311 transmits to the transmitting mobile phone 300 a BS release order for informing the transmitting mobile phone 300 of the release of connection. As a result, in either case, one mobile phone terminates the data exchange and the connection with the other mobile phone (S660).

FIG. 7 is a flowchart showing the process of exchanging data between mobile phones through the PIWF service as shown in FIG. 4.

In the process of exchanging data through the PIWF service, a user desiring to transmit data makes a phone call by manipulating the keypad of a mobile phone 400 (that is, a terminal). Then, the mobile phone 400 transmits an origination message for requesting a data call from the BS 410 (S500) through service option 0×8003. As depicted in FIG. 4, the MSC 430 processes the data call, and transmits a signal for informing the transmitting mobile phone 400 of connection with the receiving mobile phone 401 (S710).

When the transmitting and receiving mobile phones 400 and 401 are connected with each other, the mobile phones 400 and 401 are operated in data exchange mode. Accordingly, the transmitting mobile phone 400 considers all data as data transmitted from the receiving mobile phone 401 (S720).

When data exchange is completed, the transmitting user terminates the transmission of data by pressing any key. Alternatively, when a receiving user hangs up, the BS 411 transmits to the transmitting mobile phone 400 a BS release order for informing the transmitting mobile phone 400 of the termination of connection. As a result, in either case, one mobile phone terminates the data exchange and the connection with the other mobile phone (S730).

The process of transmitting data in the method discussed with respect to FIG. 7 is now described with reference to the process of receiving data described above. The receiving mobile phone 401 receives a page message having a service option 0×8003 from the BS 411 (S740). When a user presses any key or opens the folder of the mobile phone, the receiving mobile phone 401 transmits a page response to the page message to the BS 411 through the service option 0×8003 (S750).

The BS 411 transmits the page response to the MSC 431, and the MSC 431 processes the page response and transmits to the receiving mobile phone 401 a signal for informing the receiving mobile phone 401 of connection with the transmitting mobile phone 400 (S760).

When the transmitting and receiving mobile phones 400 and 401 are connected with each other, the mobile phones 400 and 401 are operated in data exchange mode. Accordingly, the receiving mobile phone 300 considers all data as data transmitted from the receiving mobile phone 301 (S770).

When data exchange is completed, the transmitting user terminates the transmission of data by pressing any key. Alternatively, when a receiving user hangs up, the BS 311 transmits to the transmitting mobile phone 400 a BS release order for informing the transmitting mobile phone 400 of the release of connection. As a result, in either case, one mobile phone terminates the data exchange and the connection with another (S780).

As described via the above illustrative embodiments, the present invention provides a method for exchanging data between two mobile phones using the IWF or PIWF service, which is capable of allowing data to be exchanged between the mobile phones without the provision of infrared ports.

The data exchange method of the present invention allows two mobile phones situated away from each other to exchange data.

Additionally, the data exchange method of the present invention enables two mobile phones to exchange melodies, animations, phone directories and multimedia as well as voice.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of exchanging data between mobile phones in an IS-95A/B or IS-95C network through a proxy inter-working function service, comprising:
    a first step in which a transmitting mobile phone initiates a data call to a receiving mobile phone;
    a second step in which the receiving mobile phone answers the data call;
    a third step in which the transmitting and receiving mobile phones are operated in data exchange mode for transmitting data from the transmitting mobile phone to the receiving mobile phone; and
    a fourth step in which data transmission from the transmitting mobile phone to the receiving mobile phone is completed,
    wherein said mobile phones transmit signals including an origination message of which a service option field's value is 0×8003.

2. The data exchange method according to claim 1, wherein, in said data exchange mode of the third step, each of the mobile phones considers all data except control data transmitted from an proxy inter-working unit as data transmitted from the other mobile phone.

3. The data exchange method according to claim 1, wherein said completion of data transmission of the fourth step is terminated when an end key of any of the mobile phones is pressed by a user.

* * * * *